April 17, 1951  E. M. PUFFER  2,549,234
MOTOR VEHICLE WINDOW SCREEN
Filed May 17, 1946  3 Sheets—Sheet 1
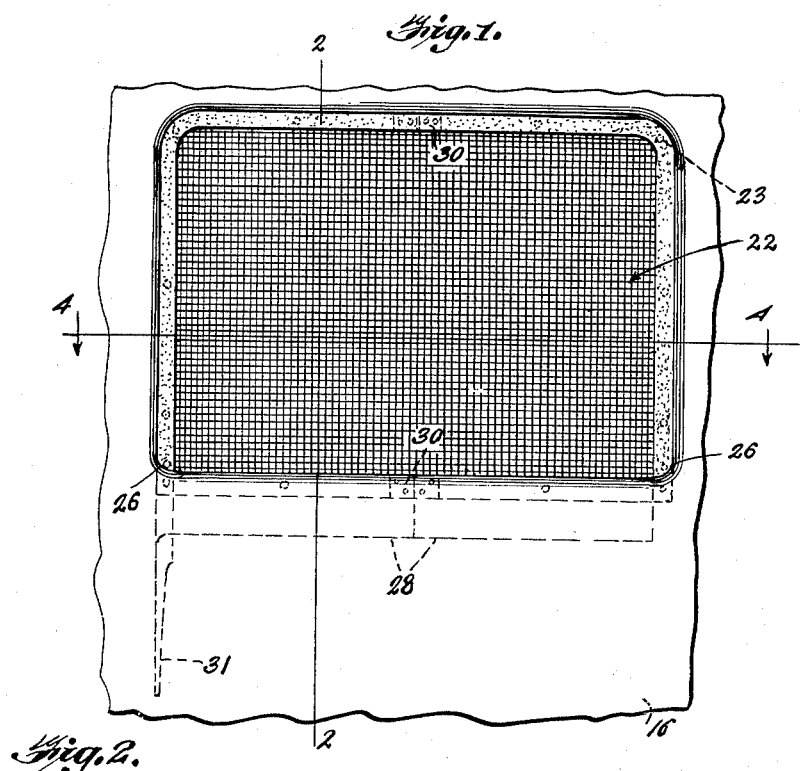
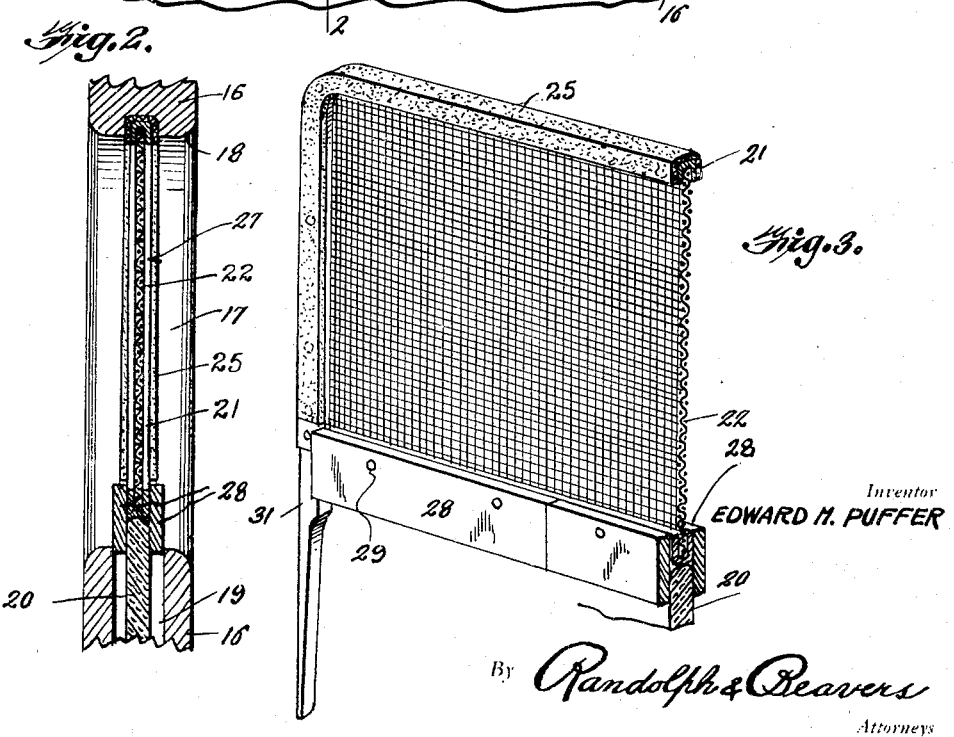
Inventor
EDWARD M. PUFFER
By Randolph & Beavers
Attorneys

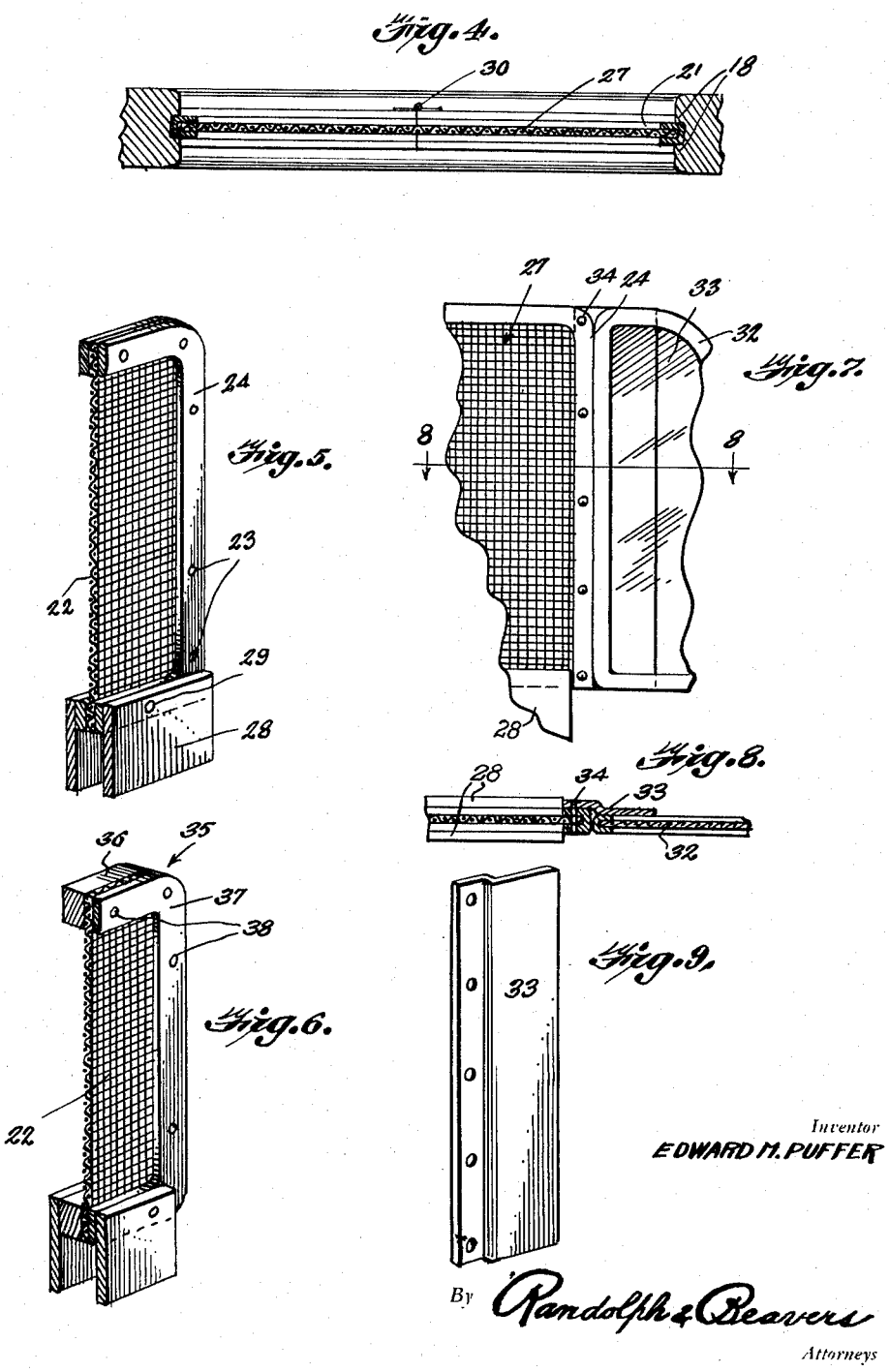

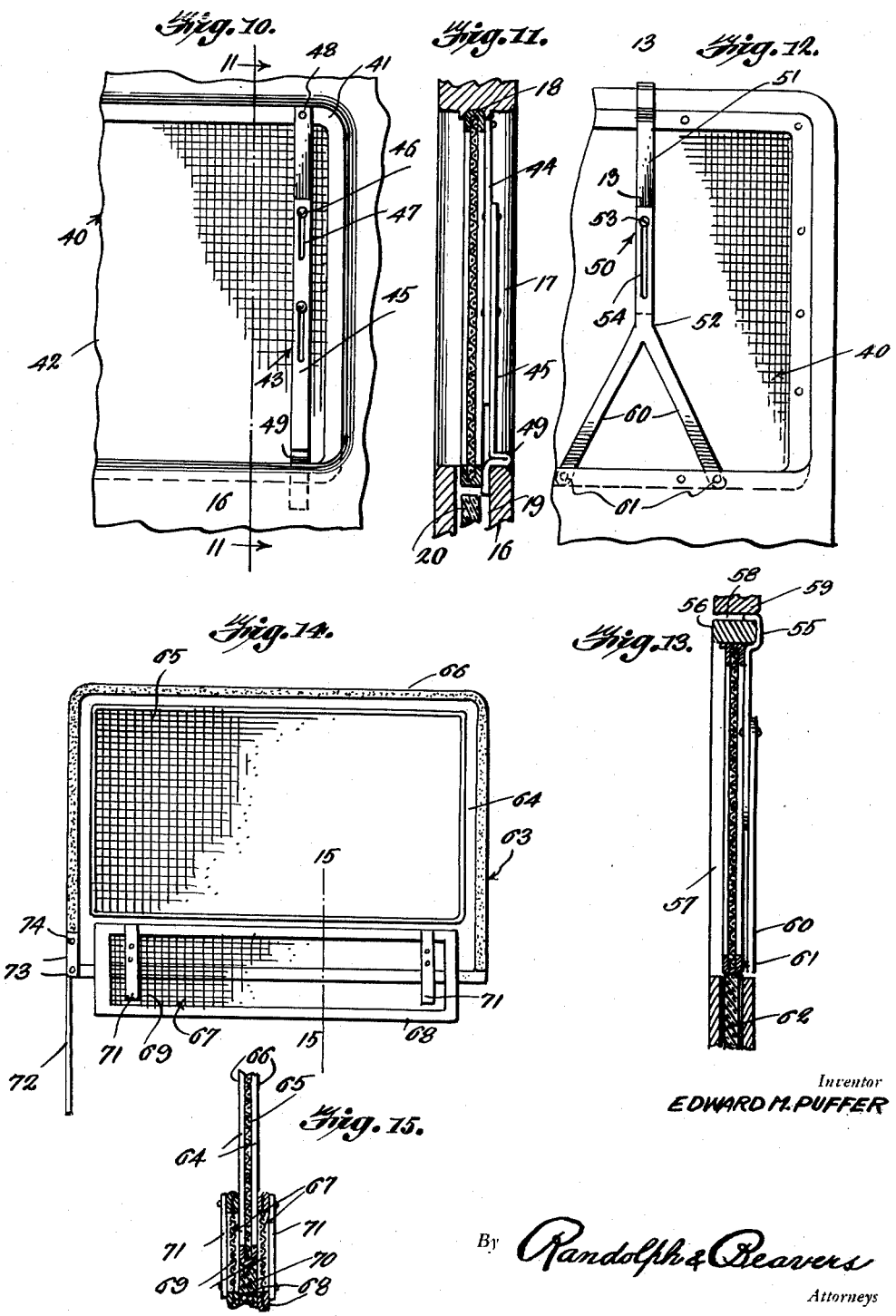

Patented Apr. 17, 1951

2,549,234

UNITED STATES PATENT OFFICE 2,549,234

MOTOR VEHICLE WINDOW SCREEN

Edward M. Puffer, Calmar, Iowa

Application May 17, 1946, Serial No. 670,429

4 Claims. (Cl. 160—102)

This invention relates to a novel construction of window screen attachment for the windows of motor vehicles and is especially intended to provide a demountable screen capable of being readily applied to the window opening of vehicle doors and to be effectively retained in place therein by engagement with the retracted window to thereby provide a screen attachment which cannot be removed from the outside of the door and will thereby function to permit the vehicle doors to be effectively maintained in their locked condition, while at the same time permitting ventilation of the interior of the vehicle.

It is an object of the invention to provide a window screen which is constructed and arranged to readily fit the window tracks or guides of a vehicle window opening when the window pane is retracted and which is provided with means at its lower edge for receiving the upper edge of the window pane so that the window pane can be advanced into engagement therewith for effectively locking the screen in position.

Another object of the invention is to provide a window screen having a fabric frame for reinforcing the screen and protecting the finish of the window opening.

A further object of the invention is to provide a window screen having a flexible or collapsible frame to facilitate the application of the screen to the window pane guide of a window opening.

Other objects and advantages of the invention will hereinafter become more fully apparent from the following description of the drawings, which illustrate preferred embodiments thereof, and wherein:

Figure 1 is a side elevational view showing a preferred embodiment of the invention applied to the window opening of a vehicle door;

Figure 2 is a transverse vertical sectional view thereof, taken substantially along a plane as indicated by the line 2—2 of Figure 1;

Figure 3 is a fragmentary perspective view of a portion of the window screen and showing a portion of the upper edge of the window pane in engagement therewith;

Figure 4 is a horizontal sectional view taken substantially along a plane as indicated by the line 4—4 of Figure 1;

Figure 5 is a fragmentary perspective view of a portion of a slightly modified form of the invention;

Figure 6 is a view similar to Figure 5 of another modification thereof;

Figure 7 is a fragmentary side elevational view showing a modification of the invention for use with a window having a window ventilator section;

Figure 8 is a horizontal sectional view thereof taken substantially along a plane as indicated by the line 8—8 of Figure 7;

Figure 9 is a perspective view of one of the parts shown in Figures 7 and 8;

Figure 10 is a side elevational view of another modified form of the invention;

Figure 11 is a transverse vertical sectional view thereof taken substantially along a plane as indicated by the line 11—11 of Figure 10;

Figure 12 is a view similar to Figure 10 and showing a modified form of the bracket of Figure 10;

Figure 13 is a view similar to Figure 11 of the form of the invention as shown in Figure 12;

Figure 14 is a modification of the form of the invention as shown in Figures 1 to 3 and illustrating the modified construction in side elevation, and Figure 15 is a fragmentary cross sectional view taken along the line 15—15 of Figure 14.

Referring more specifically to the drawings, for the purpose of illustrating the application and use of the invention, a portion of a vehicle door or a part of a vehicle body is indicated at 16 provided with a window opening 17 which may be provided with a channel, track or guide 18 across its upper portion and along its sides. The door or body 16 is provided with a relatively deep channel or recess 19 the upper end of which opens into the bottom or sill of the window opening 17 and which is co-extensive therewith. A window pane 20 of conventional construction and of a size to normally close the opening 17 when extended, and is capable of being retracted entirely into the recess or channel 19 by means of a conventional operator, not shown.

The preferred embodiment of the invention as disclosed in Figures 1 to 4, includes a substantially rectangular frame 21 secured to the marginal edge of a strip of mesh wire fabric 22. The frame 21 may be channel shaped in cross section and arranged to open inwardly and the edge of the fabric strip 22 may be clamped therein or attached thereto by fastenings 23. If preferred, the frame may be constructed of separate frame elements 24 which are disposed on opposite sides of the edges of the screen 22, as shown in Figure 5, and which are secured together and to the screen by fastenings 23. The window screen also preferably includes a channel shaped outer frame 25 which is formed of fabric and which is disposed over the frame 21 and which may likewise be disposed over the frame members 24. The fabric frame 25 extends from the lower corners of the frame up the sides and across the top thereof and is secured at the lower corners by fastenings 26. The frame member 25 is provided to protect the finish of the window opening and may be formed of any suitable fabric and, if desired, may be made of a sufficient rigid material to replace the frame 21 or the frame members 24. As best illustrated in Figures 2 and 3, the window screen, designated generally 27 also includes two elongated strips 28 which are secured along their upper edges by fastenings 29 to the lower portions of the frame 21 or 24 and along the outer sides thereof. The strips 28 depend below the lower edge of the screen frames to form a downwardly opening channel adapted to receive the upper edge of the window pane 20, as will hereinafter be more fully explained. The strips 28 are of a length less than that of the frame 21 or 24 and terminate inwardly of the side edges thereof, as clearly illustrated in Figures 1 and 4. As best seen in Figure 1, the frame 21 and the strips 28 are preferably formed of sections connected by hinges 30 at the top and bottom of the screen 27 and intermediate of its side edges. The frame members 24 may likewise be hingedly connected, if required, and as will hereinafter become apparent. One side edge of the frame 21 is provided with a depending extension 31 which extends to substantially below the bottom edges of the strips 28 and which is preferably tapered from its upper to its lower end.

To apply the window screen 27 to the window opening 17, the pane 20 is retracted to the extent of its movement into the recess 19 after which the lower portion of the screen 27, defined by the strips 28, is inserted into the upper part of the recess 19 sufficiently so that the upper edge of the screen 27 can be positioned under the upper portion of the window guide 18. The screen 27 is then collapsed sufficiently by being folded on the hinges 30 to permit the side portions of the frame to be engaged in the side portions of the window guides 18. The pane 20 is then advanced upwardly to cause the upper edge thereof to be received in the channel formed by the strips 28 and to engage the bottom edge of the screen frame to force the screen 27 upwardly until the upper edge of the screen frame is seated in the channel 18, as illustrated in Figure 2. As the pane 20 thus advances as far as it can be moved without being forced, the screen 27 is effectively held in an applied position in the window opening 17 for closing said opening against the passage of insects therethrough and to prevent removal of the screen 27 from the outer side of the door or body portion 16 without retracting the pane 20. It will thus be readily apparent that the screen 27 will deny access to the interior of the vehicle through the window opening 17 and cannot be removed from the window opening unless the pane 20 is retracted, so that the vehicle can be effectively locked to prevent intrusion and still be internally ventilated through the screen 27. The extension 31 is utilized with the screen 27 only in conjunction with window openings equipped with swivelly mounted ventilating pane sections as indicated at 32 in Figure 7. The extension 31 is provided to engage the edge of the pane 20 which is remote to the ventilating window 32 to retain the screen 27 to prevent forward sliding movement thereof when the window 32 is opened. Obviously, the thickness of the extension 31 will vary depending upon the amount of space available between the edge of the pane 20 and the adjacent edge wall of the recess 19.

As seen in Figure 7, a strip 33 is utilized in connection with the window screen 27 when the extension 31 is employed for holding the screen against forward displacement. Extension 33 is located at the opposite, forward end of the frame 21 or 24 of the screen 27, and as clearly illustrated in Figures 8 and 9, is secured to the inner side of the frame along one edge thereof by fastenings 34. The intermediate and opposite longitudinal edge portion of the strip 33 projects outwardly from said end of the frame and is off set outwardly to abut against a portion of the inner side of the ventilating window 32 when the latter is in a closed position, as seen in Figure 8.

In lieu of the frame 21 and the frame formed of the members 24, a strip of mesh wire fabric 22 may be contained in a frame, designated generally 35, and composed of rectangular frame members 36 and 37 which are located on opposite sides of the edges of the fabric strip 22 and which are attached together and to the fabric 22 by fastenings 38. Frame member 36 is substantially thicker than the frame member 37 for off setting the mesh wire screen fabric 22 inwardly with respect to the window opening 17, when applied thereto. Frame member 35 likewise carries strips 39, corresponding to the strips 28 and forming a downwardly opening channel for receiving the upper edge of the window pane 20.

In Figures 10 and 11 another means for mounting a vehicle window screen, designated generally 40 is illustrated. The screen 40 which is composed of a rectangular frame 41, similar to the frame 21, and a strip of mesh wire fabric 42, the edges of which are clamped therein, is supported in the window opening 17 by an adjustable bracket, designated generally 43. As best illustrated in Figure 11, the bracket 43 includes an upper bar 44 and a lower bar 45. The bar 44 carries fastenings 46 which slidably engage longitudinal slots or openings 47 in the bar 45 for varying the length of the bracket 43. Fastenings 46 are of a type adapted to be tightened for securing the bars 44 and 45 in a plurality of adjusted positions. The upper end of the bar 44 is attached by a fastening 48 to the upper portion of the frame 41 and the lower end of the bar 45 is adapted to extend into the window recess 19 between the inner side of the door or body 16 and the lower portion of the screen frame 41, which likewise projects into the upper portion of the recess 19 and above the upper edge of the retracted window pane 20. The bar 45 is provided with a folded outwardly projecting portion forming a lug or shoulder 49 which is adapted to rest on the inner portion of the sill of the window opening 17 for maintaining the upper portion of the screen frame 41 in engagement with the pane guide or channel 18. Obviously, if desired, two or more of the brackets 43 may be utilized for detachably supporting the window screen 40 in the opening 17 and it will be readily apparent that when thus applied, the screen 40 can only be removed from the inner side of the door or body portion 16.

A slightly modified construction of retaining bracket, designated generally 50 for use with the window screen 40 is illustrated in Figures 12 and 13 and includes an upper section 51 and a lower section 52. The upper section 51 carries a fastening 53 which slidably engages the slot 54 in the section 52 for varying the length of the bracket 50, and said fastening 53 is of a type capable of being tightened for securing the sections 51 and 52 in a plurality of adjusted positions. The upper section 51 is provided with an outwardly off set hook portion 55 at its upper end which is adapted to engage around the upper part of a vehicle door 56 above the window opening 57 thereof and which has a free end or bill portion which is adapted to fit into a space 58 between the upper part of the door 56 and the vehicle body 59. The lower end of the lower bracket section 52 is bifurcated and the free ends of the furcations 60 thereof are connected by fastenings 61 to the bottom edge of the frame of the window screen 40, as best illustrated in Figure 13, to detachably mount the screen in the window opening 57 and with the bottom edge thereof above the pane receiving recess of the door. As seen in Figure 13, the window pane 62, is advanced slightly into the window opening 57 to engage the bottom edge of the window screen frame. As in the embodiments previously described, the screen 40 is mounted from the inner side of the door 56 and cannot be removed from the outer side of the door.

Still another construction of window screen, designated generally 63 is disclosed in Figures 14 and 15 and includes a frame 64 and in which is secured a mesh wire fabric screen 65. The frame 64 may be provided with a cloth border 66 disposed over its side and top edges and corresponding to the border 23. In lieu of the plates or strips 28, the screen 63 is provided with mesh wire fabric panels 67 each includes an elongated rectangular frame 68 and a strip of mesh wire fabric 69. The panels 67 are suitably secured to the opposite sides of the lower portion of the frame 64 and have depending portions forming a downwardly opening channel for receiving the upper edge of the vehicle window pane 70. The panels 67 may be provided with transversely disposed reinforcing bars or strips 71 which are secured to the outer side of the frames 68 thereof. An elongated strip 72 is provided with a channel shaped upper end 73 which is secured by fastenings 74 to the lower end of one side edge of the frame 64; said strip 72 functioning in the same manner and for the same purpose as the strip 31.

Various modifications and changes are contemplated and may obviously be resorted to without departing from the spirit and scope of the invention as hereinafter defined by the appended claims.

I claim:

1. In a screen for motor vehicle windows, a strip of mesh wire fabric, a frame secured around the edge of said strip, and channel means depending from the lower portion of the frame and receivable in a window pane receiving recess of a vehicle door or body and for receiving the upper edge of a window pane therein, whereby the pane may be partially projected for clamping the frame in the window opening, said frame being formed of sections hinged intermediate of the ends thereof for partially collapsing the window screen for positioning it in the window opening.

2. In a screen for motor vehicle windows, a strip of mesh wire fabric, a frame secured around the edge of said strip, and channel means depending from the lower portion of the frame and receivable in a window pane receiving recess of a vehicle door or body and for receiving the upper edge of a window pane therein, whereby the pane may be partially projected for clamping the frame in the window opening, and a fabric covering disposed over the upper and side edges of the frame to contact the surface of the window opening.

3. In a screen for motor vehicle windows, a strip of mesh wire fabric, a frame secured around the edge of said strip, and channel means depending from the lower portion of the frame and adapted to be received in a window pane receiving recess of a vehicle door or body and for receiving the upper edge of a window pane therein, whereby the pane may be partially projected for clamping the frame in the window opening, said downwardly opening channel portion being formed by elongated panels secured to the opposite sides of the lower edge of the window screen frame and having edge portions depending therefrom, said panels each comprising an elongated strip of mesh wire fabric and a retaining frame enclosing the edges thereof.

4. A screen for motor vehicle windows as in claim 2, and a retaining strip secured to one upright edge of the frame and projecting therefrom in a direction away from the frame to engage against a portion of the inner side of a closed ventilating window of said window opening and preventing removal of the screen externally of the window opening while the ventilating window is in a closed position.

EDWARD M. PUFFER.

REFERENCES CITED

The following references are of record in the file of this patent:

UNITED STATES PATENTS

| Number | Name | Date |
| --- | --- | --- |
| 1,639,589 | Collton | Aug. 16, 1927 |
| 1,758,158 | James | May 13, 1930 |
| 1,888,038 | Hoiland | Nov. 15, 1932 |
| 2,109,160 | Yurkovich | Feb. 22, 1938 |